(12) United States Patent
Holden

(10) Patent No.: US 9,848,183 B1
(45) Date of Patent: Dec. 19, 2017

(54) DISPLAY SYSTEM

(71) Applicant: Roger William Holden, Lawrence, KS (US)

(72) Inventor: Roger William Holden, Lawrence, KS (US)

( * ) Notice: Subject to any disclaimer, the term of this patent is extended or adjusted under 35 U.S.C. 154(b) by 130 days.

(21) Appl. No.: 14/881,033

(22) Filed: Oct. 12, 2015

Related U.S. Application Data

(60) Provisional application No. 62/063,208, filed on Oct. 13, 2014.

(51) Int. Cl.
  *G09G 5/00* (2006.01)
  *H04N 13/04* (2006.01)
  *H04N 13/02* (2006.01)
  *G02B 27/22* (2006.01)
  *G03B 21/60* (2014.01)

(52) U.S. Cl.
  CPC ..... *H04N 13/0402* (2013.01); *G02B 27/2221* (2013.01); *G03B 21/60* (2013.01); *H04N 13/0207* (2013.01); *H04N 13/0497* (2013.01)

(58) Field of Classification Search
  None
  See application file for complete search history.

(56) References Cited

U.S. PATENT DOCUMENTS

| 2,157,138 A | 5/1939 | Fidel |
| 2,251,850 A | 8/1941 | Fidel |
| 2,320,760 A | 6/1943 | Surre |
| 2013/0077163 A1* | 3/2013 | Shoji .................. G02B 27/022 359/479 |

* cited by examiner

*Primary Examiner* — Ifedayo Iluyomade
(74) *Attorney, Agent, or Firm* — Plager Schack LLP; Mark Plager; Michael O'Brien

(57) ABSTRACT

A display system is configured to display a stereoscopic three dimensional relief effect in aerial space from a two dimensional image source. The display system has a reflector, having a generalized cylindrical concave surface. The two dimensional image source is arranged between the first side and the second side facing the generalized cylindrical concave surface. The reflector reflects light from the two dimensional image source outward as an aerial image. The aerial image exhibits the stereoscopic three dimensional relief effect. A support structure is operably connected to the reflector and the two dimensional image source. The reflector and the two dimensional image source are adapted to be individually rotated and tilted relative to one another while their position is physically secured.

10 Claims, 4 Drawing Sheets

DISPLAY SYSTEM

RELATED APPLICATION

This application claims priority to provisional patent application U.S. Ser. No. 62/063,208 filed on Oct. 13, 2014, the entire contents of which is herein incorporated by reference.

BACKGROUND

The embodiments herein relate generally to conversion of images from two dimensions to three dimensions in aerial space.

Prior to embodiments of the disclosed invention, there was a need for a commercially viable, lower cost visual display that presents a stereoscopic three dimensional relief effect from an ordinary two dimensional image source without the need for special eyeglasses. There was also a need for a commercially viable, lower cost visual display that presented an aerial holographic-like image effect from an ordinary two dimensional image source without the need for special eyeglasses. Single cylindrical concave reflective surfaces have been proposed as a cost effective solution to these type of needs. Previous endeavors in this field involving a single concave cylindrical reflective surface and a two dimensional image source include:

U.S. Pat. Nos. 2,157,138 and 2,251,850 both issued to Fidel; and U.S. Pat. No. 2,320,760 issued to Surre. In the Fidel patents and Surre, a single concave right cylindrical reflective surface is used without an adequate theory of how to manufacture it at a cost advantage or without an adequate theory as to how to arrange the image on the concave cylindrical surface. The embodiments of the disclosed invention use a unique single concave generalized cylindrical reflective surface and arrangements of the components relative to each other to solve those problems. SUMMARY A display system is configured to display a stereoscopic three dimensional relief effect in aerial space from a two dimensional image source. The display system has a reflector, having a generalized cylindrical concave surface. The two dimensional image source is arranged between the first side and the second side facing the generalized cylindrical concave surface. The reflector reflects light from the two dimensional image source outward as an aerial image. The aerial image exhibits the stereoscopic three dimensional relief effect. A support structure is operably connected to the reflector and the two dimensional image source. The reflector and the two dimensional image source are adapted to be individually rotated and tilted relative to one another while their positions are physically secured.

In some embodiments, the lower arc curvature is different than the upper arc curvature. The first side upper point and the second side upper point are directly connected with an upper line segment. The first side lower point and the second side lower point are directly connected with a lower line segment. An upper bisect segment, bisects the upper line segment at a first right angle and intersects the upper arc. A lower bisect segment bisects the lower line segment at a second right angle and intersects the lower arc. The lower bisect segment and the upper bisect segment vary in length by at least 5% but no more than 700%.

A first side support can be attached to the first side and a second side support can be attached to the second side. In some embodiments, tape can be wrapped along the first side and the second side. Tape can be wrapped along the lower arc and the upper arc. The reflector can be a singularly molded concave generalized cylindrical curved surface.

A process to display a stereoscopic 3-D relief effect in aerial space from a 2-D image source can include the following steps, which are not necessarily in order. First, obtaining a 2-D image source with a 2-D image displayed thereon. Next, arranging a reflector, having a generalized cylindrical concave surface proximate in front of the 2-D image source. The generalized cylindrical concave surface is defined by a lower arc terminating in a first side lower point and a second side lower point and having a lower arc curvature there between. An upper arc terminates in the first side upper point and a second side upper point and having an upper arc curvature there between. A first side is formed by a chord connecting the first side lower point and the first side upper point. A second side is formed by a chord connecting the second side lower point and the second side upper point. After that, reflecting the 2-D image source off the reflector into aerial space. Following that, observing an uncompensated stereoscopic 3-D relief effect in the aerial space. Then, modifying the shape of the 2-D image to convert the uncompensated stereoscopic 3-D relief effect to the desired compensated stereoscopic 3-D relief effect. Next, operably connecting a support structure to the reflector and the two dimensional image source. After that, enhancing the desired compensated stereoscopic 3-D relief effect by tilting and rotating the 2-D image source. Following that, enhancing the desired compensated stereoscopic 3-D relief effect by tilting and rotating the reflector.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
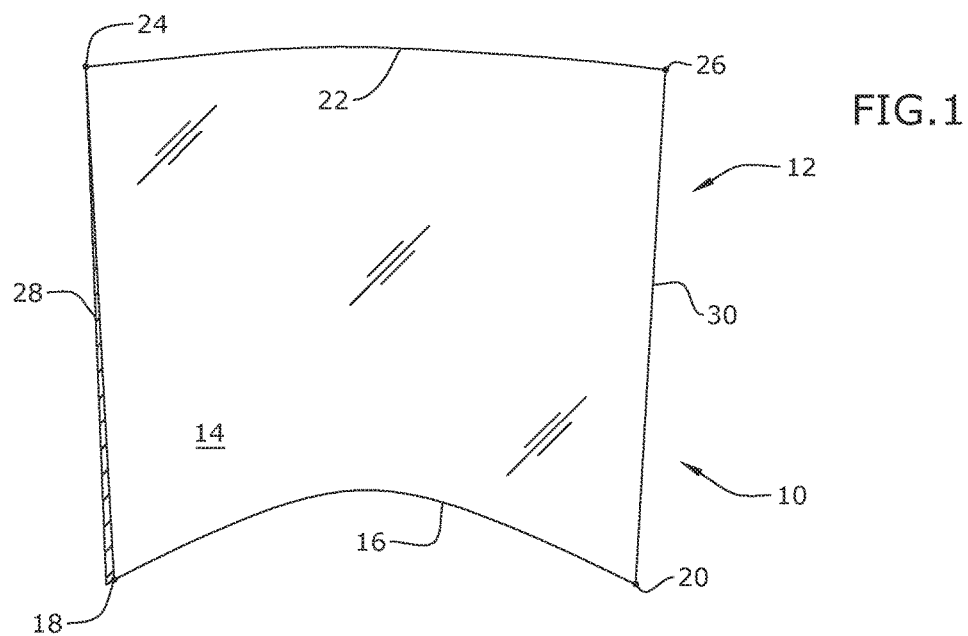
FIG. 1 shows a front view of an embodiment of the invention.

By way of example, and referring to FIG. 1, one embodiment of display system 10 comprises reflector 12. Reflector 12 further comprises generalized cylindrical concave surface 14. A cylinder is a solid geometric figure with straight parallel sides and a circular or oval cross section. A cylinder can further include a solid or hollow body, object, or part having the shape of a cylinder. When this hollow body is bisected a cylindrical concave surface results from the inside looking out, and a cylindrical convex surface results from the outside looking in. When the sides of the cylindrical concave surface are manipulated so that they are no longer parallel to one another a "generalized cylindrical concave surface" results.

Generalized cylindrical concave surface 14 further comprises lower arc 16 terminating in first side lower point 18 and second side lower point 20. Lower arc 16 further comprises a lower arc curvature. Generalized cylindrical concave surface 14 further comprises upper arc 22 terminating in first side upper point 24 and second side upper point 26. Upper arc 22 further comprises an upper arc curvature. First side 28 is formed by a first chord connecting first side lower point 18 and first side upper point 24. Second side 30 is formed by a second chord connecting second side lower point 20 and second side upper point 26.

Generalized cylindrical concave reflective surface 14 is the easiest and least expensive of any concave reflective cylindrical surface to assemble and manufacture using cold forming techniques. Generalized cylindrical concave surface 14 may be easily cold formed by appropriately bending a reflective flat sheet by hand or machine in a functional concave curved shape and securing the shape by support means such as adhesive tape, posts and many other means. The reflective flat sheet material used for the reflector may be comprised of plastic, metal or any other malleable glossy reflective sheet material.

Figure 2:
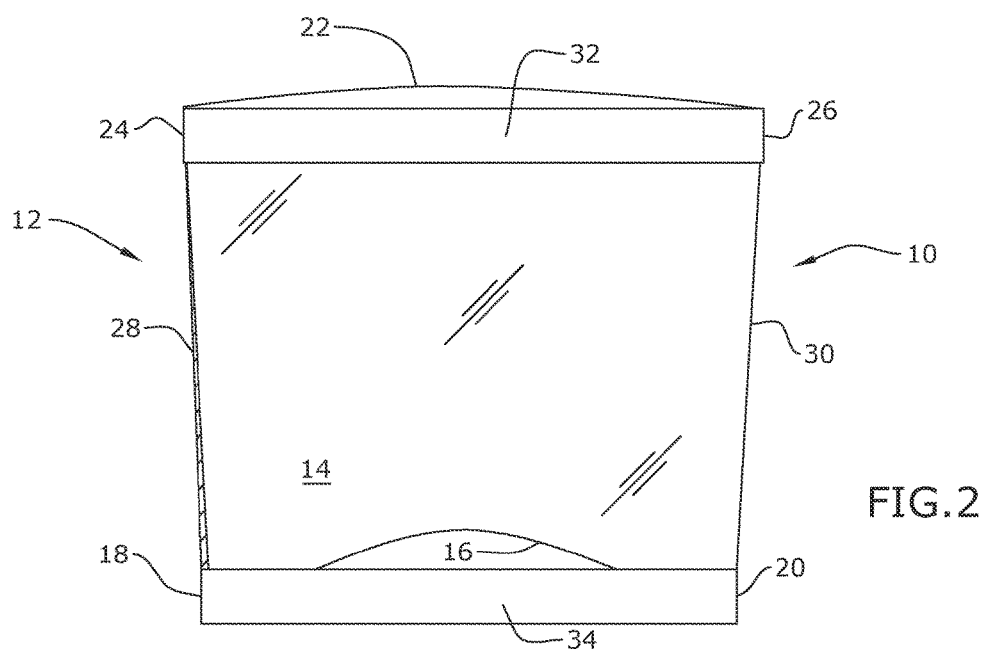
FIG. 2 shows a front view of an embodiment of the invention.

Turning to FIG. 2, image reflection can be achieved by having the lower arc curvature differ from the upper arc curvature. One way this can be accomplished through the process of cold forming of a flat reflective sheet is by affixing upper adhesive tape 32 to an upper line segment between first side upper point 24 and second side upper point 26. Then by affixing lower adhesive tape 34 to a lower line segment between first side lower point 18 and second side lower point 20.

Figure 3:
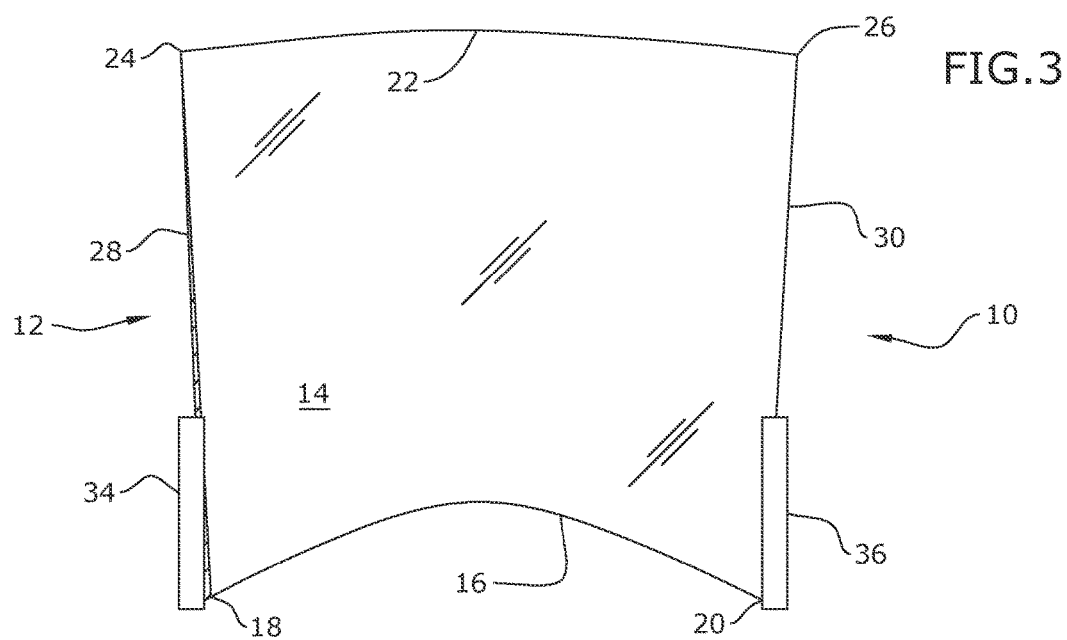
FIG. 3 shows a front view of an embodiment of the invention.

As shown in FIG. 3, a user may desire to hold reflector 12 in place in order to achieve an effective curvature of the generalized cylindrical concave surface 14. This cold forming of the reflector's curvature can be accomplished by attaching first side support 34 to first side 28 and second side support 36 to second side 30. Attachment can be accomplished in any known way such as adhesives, connectors, or grooves and protrusions among others. Many other cold forming techniques may be used to secure the concave generalized cylindrical surface and the present invention is not limited just to the ones disclosed herein.

Generalized cylindrical concave surface 14 may also be formed and replicated using a mold that reproduces the optically functional concave generalized cylindrical curved surface of the reflector. A source of the mold's shape would be a proper geometric model of the invention's concave generalized cylindrical surface.

Figure 4:
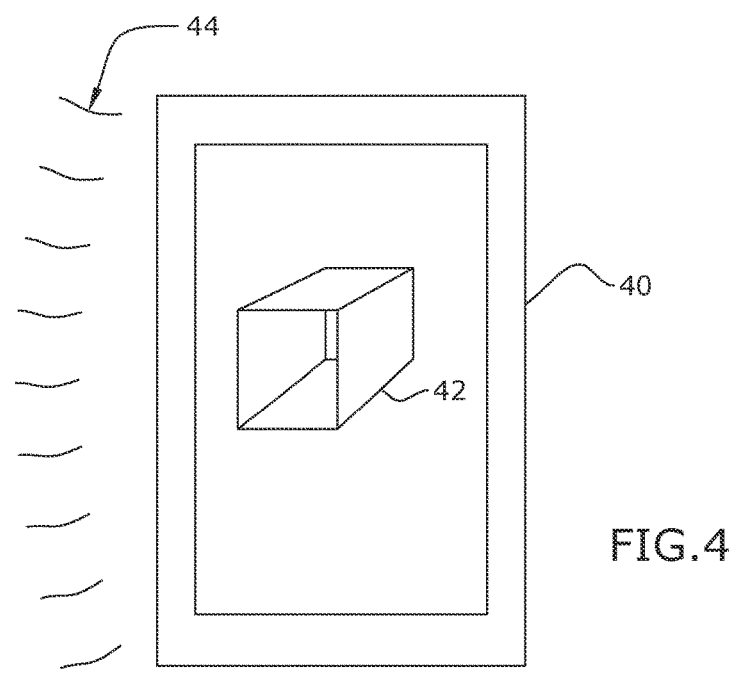
FIG. 4 shows a front view of an embodiment of the invention.
Figure 5:
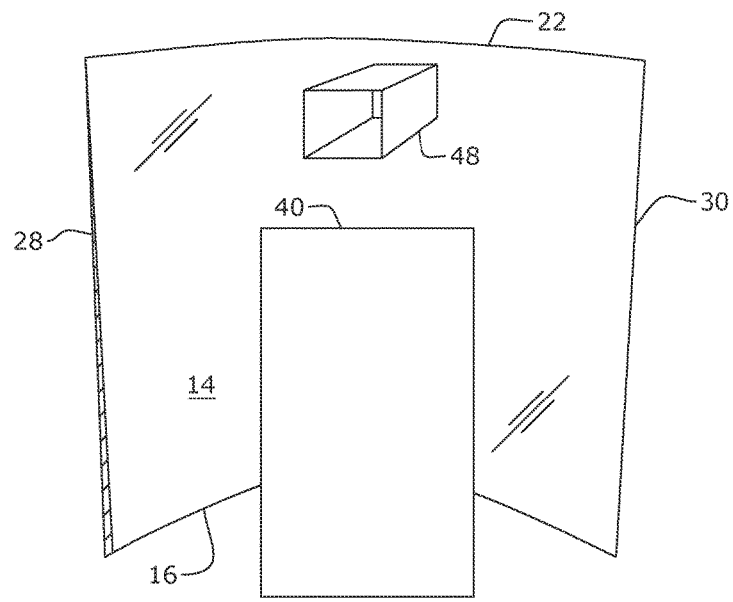
FIG. 5 shows a front view of an embodiment of the invention.

Turning to FIG. 4 and FIG. 5, two dimensional image source 40 provides image 42 and light 44. Two dimensional image source 40 is arranged between first side 28 and second side 30 facing reflector 12. Image 42 and light 44 are reflected off reflector 12 outward to produce aerial image 48. Aerial image 48 has both a stereoscopic three dimensional relief effect and an aerial holographic-like image effect. A stereoscopic 3D image typically refers to a process by which two photographs of the same object taken at slightly different angles are viewed together, creating an impression of depth and solidity. In the present invention, the term means that a process results in a single image being reflected to create an impression of depth and solidity. To do that there is a desired three dimensional image and an original two dimensional source image. When reflected, in some embodiments, the desired three dimensional image and aerial image 48 vary by a distortion factor. The original two dimensional source image can then be modified to remove the distortion factor so that the desired three dimensional image and aerial image 48 are identical. Removing that distortion creates the desired stereoscopic three dimensional relief effect. The inventor has also found that the shape of the generalized cylindrical concave reflective surface adds a unique enhancement to the stereoscopic three dimensional relief effect of the aerial image. The "aerial holographic-like image effect" means that the image appears unsupported in aerial space and that the image begins and ends between reflector 12 and the user. The image does not bridge the gap between the two. When the observer moves in the axial direction of reflector 12 the aerial image 48 accompanies the movement. The aerial image 48 thus appears to levitate simply by the observer moving towards or back from reflector 12. This is because all cylindrical concave surfaces exhibit axicon like behavior in their aerial reflections. This axicon like behavior provides a superior floating holographic like illusionary effect that cannot be achieved with other common concave reflective surface shapes such as a spherical mirror.

Figure 6:
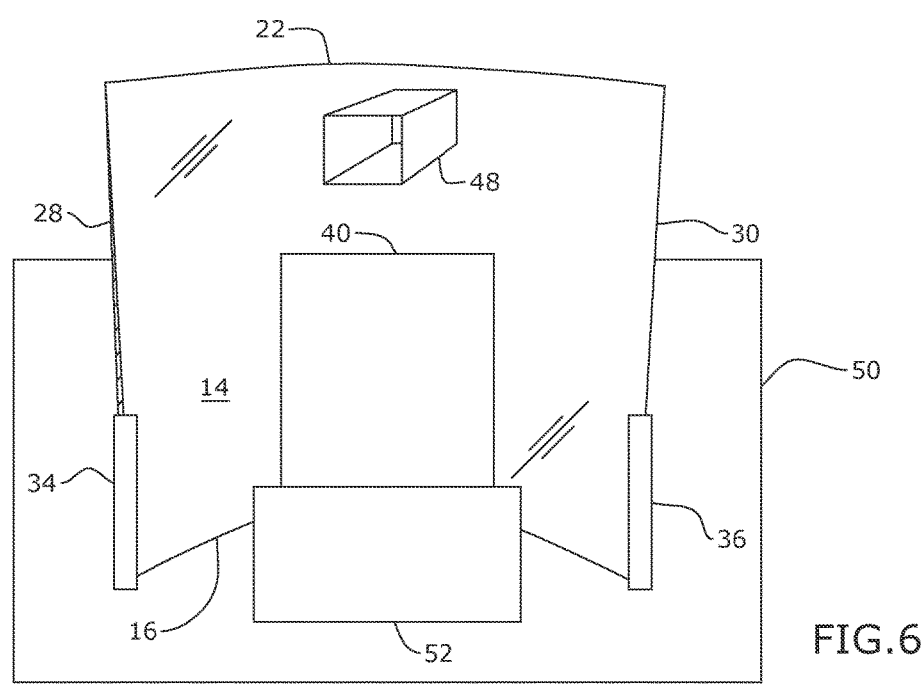
FIG. 6 shows a front view of an embodiment of the invention.

As shown in FIG. 6, reflector 12 and two dimensional image source 40 are operably connected to support structure 50. Two dimensional image source 40 is operably connected to support structure 50 with platform enhancement 52. Reflector 12 and two dimensional image source 40 can be tilted and rotated relative to one another on platform 50. Even after removing the distortion as stated above, the location and height of reflector 12 and two dimensional image source 40 can still result in a viewing range that is not desired by the user. Further, the image could still be enhanced. This can be accomplished by tilting and rotating two dimensional image source 40 to obtain a desired viewing range and enhancement of the stereoscopic three dimensional relief effect of aerial image 48. Then, tilting and rotating reflector 12 to obtain the desired viewing range and further enhancement of the stereoscopic three dimensional relief effect of aerial image 48 to create a desired compensated stereoscopic three dimensional relief effect. Tilting and rotating can be done in a sequence of tilts and rotations at an angle which is defined as less than or equal to 90 degrees.

Figure 7:
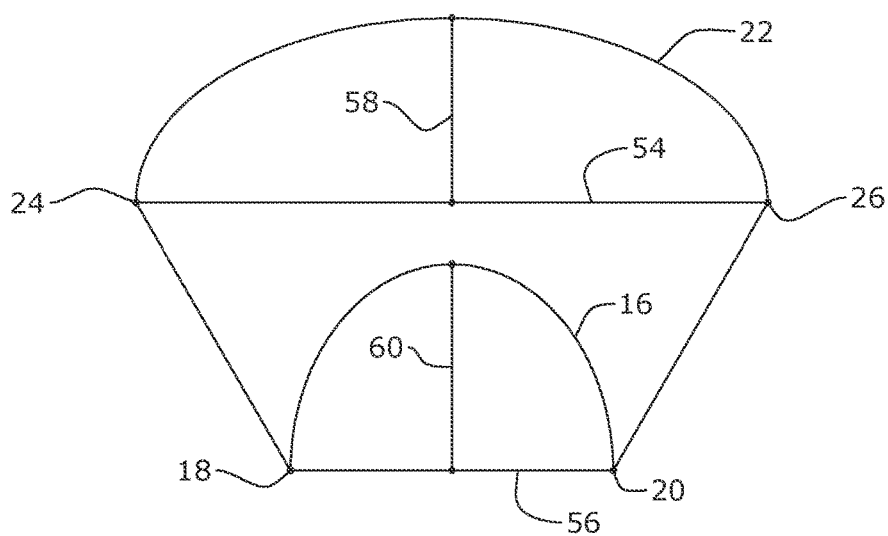
FIG. 7 shows a top view of an embodiment of the invention.

As shown in FIG. 7, first side upper point 24 and second side upper point 26 are directly connected with upper line segment 54. First side lower point 18 and second side lower point 20 are directly connected with lower line segment 56. Upper bisect segment 58 bisects upper line segment 54 at a first right angle and intersects upper arc 22. Lower bisect segment 60 bisects lower line segment 56 at a second right angle and intersects the lower arc 16. In some embodiments, lower bisect segment 60 and upper bisect segment 58 vary in length by at least 5% but no more than 700%.

The present invention may also optionally be combined with a good variety of additional technologies, two examples of which will be mentioned. Audio technology may be combined with the invention so as to enhance the overall sensory experience. Also technology which allows for aerial gesturing control of the displayed aerial images is advantageous for interaction with the viewer. The present invention is not limited by these two examples of combining technologies, many others which are also possible.

The applications of the invention are very numerous. They range from advertising to education, gaming to adult entertainment and are not limited just to these applications herein mentioned.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. §112, ¶6. In particular, any use of "step of" in the claims is not intended to invoke the provision of 35 U.S.C. §112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A display system, configured to display a stereoscopic three dimensional relief effect in aerial space from a two dimensional image source; the display system comprising:
    a reflector, having a generalized cylindrical concave surface defined by:
    a lower arc terminating in a first side lower point and a second side lower point and having a lower arc curvature therebetween; and
    an upper arc terminating in a first side upper point and a second side upper point and having an upper arc curvature therebetween;
    a first side, formed by a first chord connecting the first side lower point and the first side upper point;
    a second side, formed by a second chord connecting the second side lower point and the second side upper point;
    the two dimensional image source, arranged between the first side and the second side facing the generalized cylindrical concave surface; wherein the reflector reflects light from the two dimensional image source outward as an aerial image; wherein the aerial image exhibits the stereoscopic three dimensional relief effect; and
    a support structure, operably connected to the reflector and the two dimensional image source, wherein the reflector and the two dimensional image source are adapted to be individually rotated and tilted relative to one another while their position is physically secured;
    wherein the first side upper point and the second side upper point are directly connected with an upper line segment;
    wherein the first side lower point and the second side lower point are directly connected with a lower line segment;
    wherein an upper bisect segment, bisects the upper line segment at a first right angle and intersects the upper arc;
    wherein a lower bisect segment bisects the lower line segment at a second right angle and intersects the lower arc; and
    wherein the lower bisect segment and the upper bisect segment vary in length by at least 5% but no more than 700%.

2. The display system of claim 1, wherein the lower arc curvature is different than the upper arc curvature.

3. The display system of claim 1, further comprising a first side support attached to the first side and a second side support attached to the second side.

4. The display system of claim 1, further comprising tape wrapped along the first side and the second side.

5. The display system of claim 4, further comprising tape wrapped along the lower arc and the upper arc.

6. The display system of claim 1 wherein the reflector is a singularly molded concave generalized cylindrical curved surface.

7. A process to display a stereoscopic 3-D relief effect in aerial space from a 2-D image source, the process comprising:
    obtaining a 2-D image source with a 2-D image displayed thereon;
    arranging a reflector, having a generalized cylindrical concave surface proximate in front of the 2-D image source; wherein the generalized cylindrical concave surface is defined by:
    a lower arc terminating in a first side lower point and a second side lower point and having a lower arc curvature there between; and
    an upper arc terminating in the first side upper point and a second side upper point and having an upper arc curvature therebetween;
    a first side, formed by a chord connecting the first side lower point and the first side upper point;
    a second side, formed by a chord connecting the second side lower point and the second side upper point;
    an upper bisect segment, formed by a chord bisecting the upper line segment at a first right angle and intersects the upper arc;
    a lower bisect segment, formed by a chord bisecting the lower line segment at a second right angle and intersects the lower arc; and
    wherein the lower bisect segment and the upper bisect segment vary in length by at least 5% but no more than 700%
    reflecting the 2-D image source off the reflector into aerial space;
    observing an uncompensated stereoscopic 3-D relief effect in the aerial space; and
    modifying the shape of the 2-D image to convert the uncompensated stereoscopic 3-D relief effect to the desired compensated stereoscopic 3-D relief effect.

8. The process of claim 7, further comprising operably connecting a support structure to the reflector and the two dimensional image source.

9. The process of claim 8, further comprising enhancing the desired compensated stereoscopic 3-D relief effect by tilting and rotating the 2-D image source.

10. The process of claim 8, further comprising enhancing the desired compensated stereoscopic 3-D relief effect by tilting and rotating the reflector.

* * * * *